United States Patent [19]
Hofmann

[11] Patent Number: 5,374,777
[45] Date of Patent: Dec. 20, 1994

[54] CONNECTING DEVICE FOR CONTACT MEMBERS AND ELECTRIC SWITCH

[75] Inventor: Georg Hofmann, Heilbronn-Horkheim, Germany

[73] Assignee: SWF Auto-Electric, Germany

[21] Appl. No.: 120,205

[22] Filed: Sep. 13, 1993

Related U.S. Application Data

[63] Continuation of Ser. No. 709,513, Jun. 3, 1991, abandoned.

[30] Foreign Application Priority Data

Jun. 1, 1990 [DE] Germany .................... 4017674

[51] Int. Cl.⁵ .................................. H01R 13/627
[52] U.S. Cl. ........................ 174/50; 439/346; 439/354
[58] Field of Search ............. 174/50; 439/346, 350, 439/353, 354, 357

[56] References Cited

U.S. PATENT DOCUMENTS

| | | | |
|---|---|---|---|
| 3,133,777 | 5/1964 | Anhalt | 439/350 |
| 3,805,211 | 4/1974 | Moore | 439/346 X |
| 3,828,300 | 8/1974 | Codrine | 439/346 |
| 4,109,989 | 8/1978 | Snyder, Jr. et al. | 439/357 X |
| 5,015,199 | 5/1991 | Hirano et al. | 439/357 X |

*Primary Examiner*—Leo P. Picard
*Assistant Examiner*—D. A. Tone
*Attorney, Agent, or Firm*—Robert P. Seitter; J. Gordon Lewis

[57] ABSTRACT

Insertion of plug-in connections connected with cables of a first electric switch in a correspondingly shaped component of a second electric switch, so that the plug-in connections of the first electric switch and the plug-in connections of the second one can easily be connected to the motor vehicle electric network by a single counterplug eliminates the need for a separate plug housing for the plug-in connections of the first switch.

19 Claims, 6 Drawing Sheets

CONNECTING DEVICE FOR CONTACT MEMBERS AND ELECTRIC SWITCH

This is a continuation of copending application Ser. No. 07/709,513, filed on Jun. 3, 1991 is now abandoned.

INTRODUCTION

The present invention relates to a connecting device with locking means for producing connections between contact members and switches or plugs with electrically non-conductive parts.

BACKGROUND OF THE INVENTION

Electric switches or plugs ordinarily have a plastic housing in which the electric parts are stationarily arranged. Therefore a plastic material is selected with a characteristic stability high enough to ensure the desired operating position of the individual parts, e.g. as contact blades. However these synthetic materials are normally not break-proof, which fact comes especially into existence, if it is intended to connect the switch or plug with other contact members and, indeed, by locking connections. When the parts provided for the locking connections are deflected, the parts are easily overstressed with the consequence that the plastic parts of the switch or plug break. If the plastic holding material is replaced by another synthetic material, e.g. an elastically moldable plastic material, it is ensured that the individual electric parts accommodated within the housing retain the position they occupy relative to each other, even under extreme strain on the switch or plug.

BRIEF DESCRIPTION OF THE INVENTION

Starting from the above prior art the invention is based on the problem of remedying these shortcomings. Another object of the invention is to propose a plug-in coupling which makes possible an operative connection between contact members and switches or plugs.

The problem raised is solved according to the invention in that the connecting device consists of an elastically moldable and relatively break-proof plastic material, whereas the parts are made of a harder synthetic material.

The basic idea of the invention is to form the housing and its other electrically non-conductive parts of plastic materials, the connecting device is made from a more thermoplastic material, whereas the housing consists of a thermosetting material. Thermoplastics are plastics which do not harden and can be remolded as often as desired by applying heat, whereas thermosetting are hardening or hardable plastics which, after being molded and having passed a moldable range become rigid and cannot be made soft again.

These plastics distinguish in particular by low densities, a mostly good electric insulating power and a low heat conductivity. They often have a low coefficient of friction and a high buffering capacity. It is an important and advantageous property of the plastics that they are capable of being formed and processed as well as being welded and glued.

A particularly advantageous embodiment provides for switches or plugs with at least two housing parts, that the connecting device is arranged between the housing parts. If a connecting device with a plate-shaped basic body with contact member recesses is concerned, on which locking means are arranged, then it is suitable, if the contact member recesses extending in the plug-in direction are insertable in recesses of the housing parts. These measures can also be taken in such a way that the recesses are connectable with the contact member recesses in a dimensionally stable way. The advantage of this measure is, that when the contact members are inserted into the contact member recesses these are partially deformed, whereby the dimensionally stable connection between contact member recesses and recesses ensures that the deformation is limited. The force acting upon the connecting device when the contact members are inserted partially creates a high pressure, which can be accepted by the thermoplastic without difficulty without causing damages within the contact member recesses. Because the connecting device is firmly connected with the housing the force is transmitted to the housing, whereby no deformations of the individual housing parts are effected.

An especially suitable embodiment of the invention provides that the locking means have noses formed on them which extend in the plug-in direction of the contact members and which are operatively connectable with locking recesses of the contact members. Hereby the contact member recesses have guide grooves for the contact members, whereby the locking means are formed as resilient tongues falling off from one interior wall side of the contact member recess towards the opposite interior wall.

In order to be able to simply release the locking connection another suitable development of the invention provides that the locking noses are arranged in the lower area of the tongues. Finally a suitable measure of the invention provides that the knob-shaped noses are arranged with a spacing from the lower end of the noses and cross recesses.

In order to save a plug housing and to be able to connect two electric switches easily with the electric network of the motor vehicle on a first switch a recess is provided for inserting at least a second contact member, in particular a second plug-in connection, which is connected with the other electric switch via an electric lead, in particular a cable.

BRIEF DESCRIPTION OF THE DRAWINGS

The invention is described below by way of an embodiment shown in the accompanying drawings, in which

FIG. 11, is a left-hand and a right-hand view of the switch shown in FIG. 1 with electric conductors and switch blades.

DETAILED DESCRIPTION OF THE PREFERRED EMBODIMENT OF THE INVENTION

Figure 1:
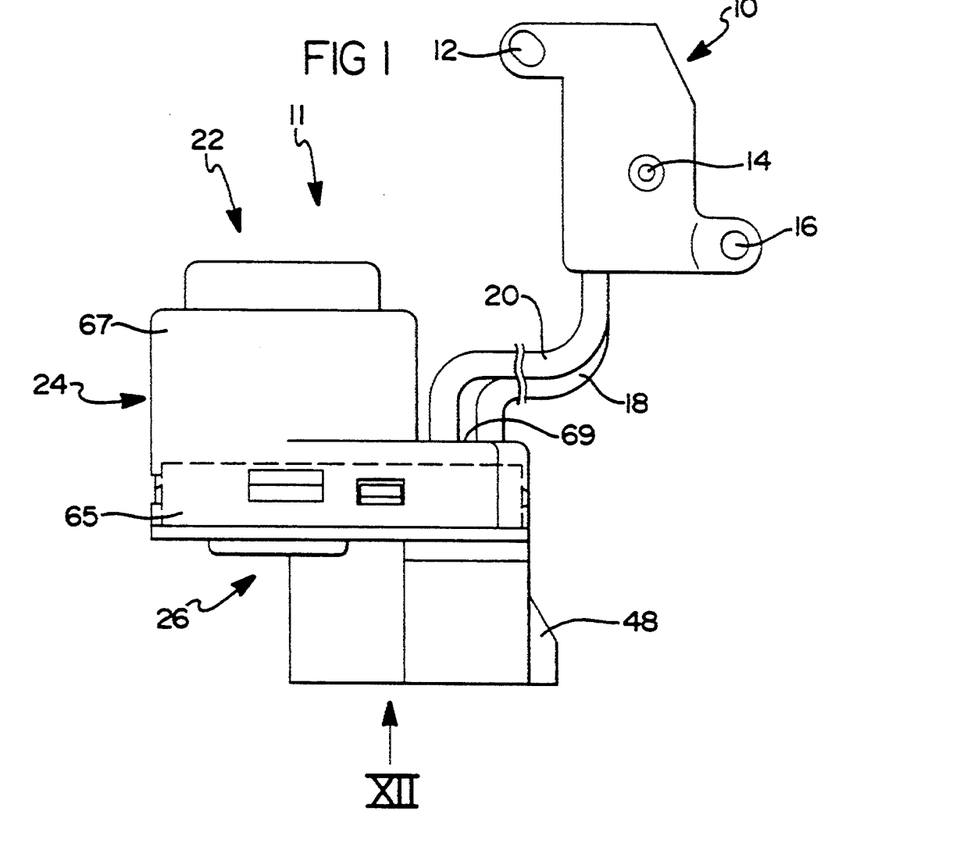
FIG. 1 shows two electric switches interconnected by a cable.
Figure 2:
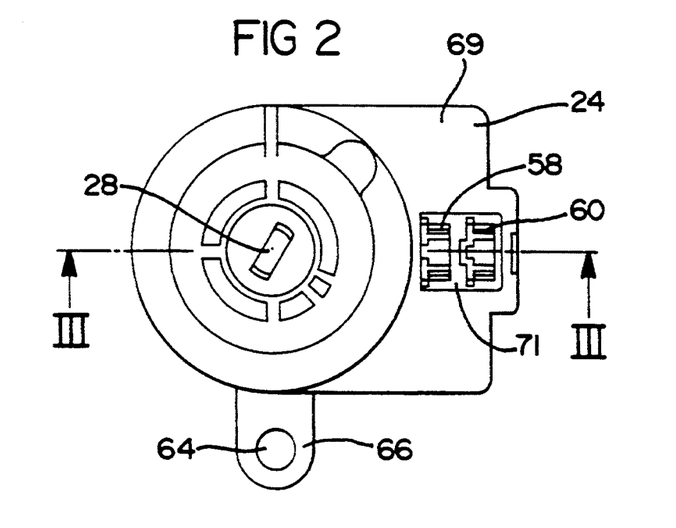
FIG. 2 is a top view on one switch according to FIG. 1 in the direction of arrow II.
Figure 3:
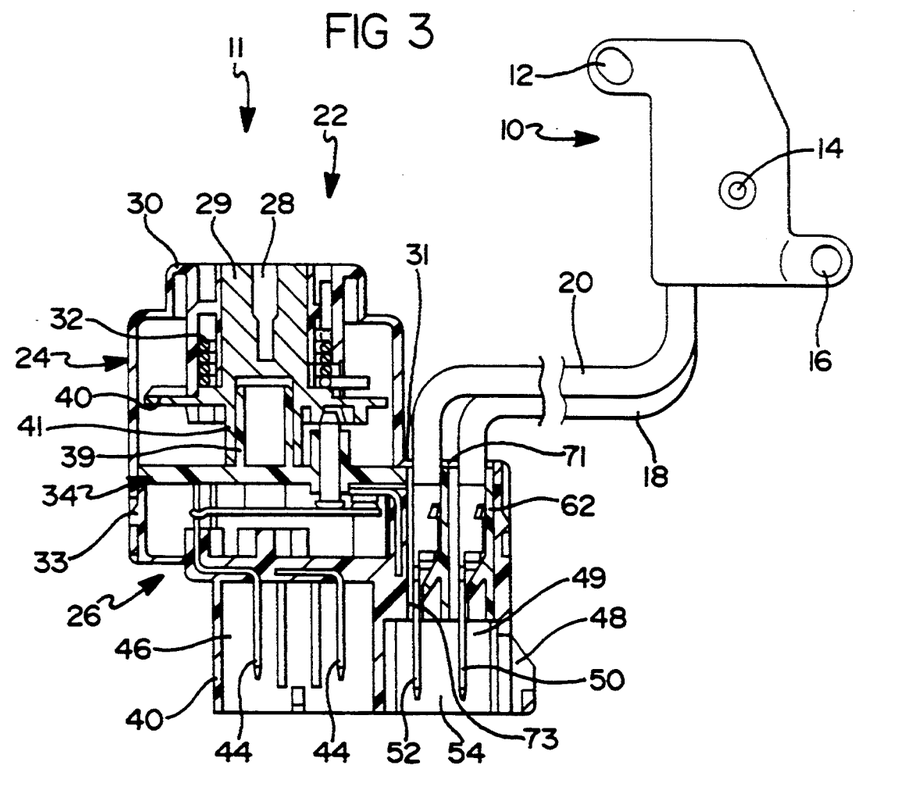
FIG. 3, is a section taken on the line III—III of FIG. 2.
Figure 4:
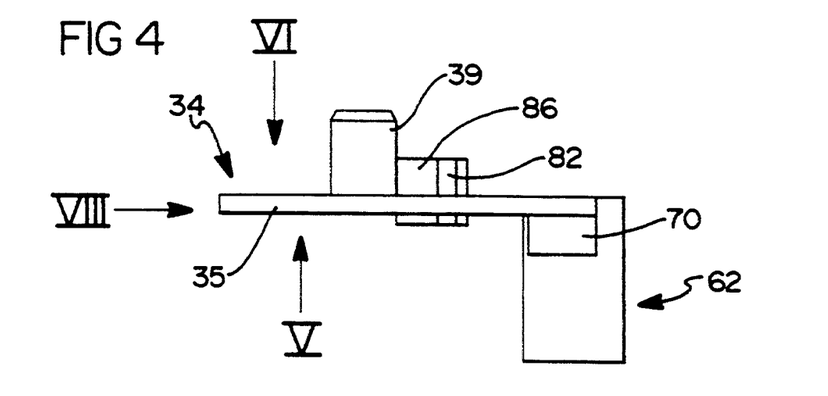
FIG. 4, is a lateral view of the connecting device.
Figure 5:
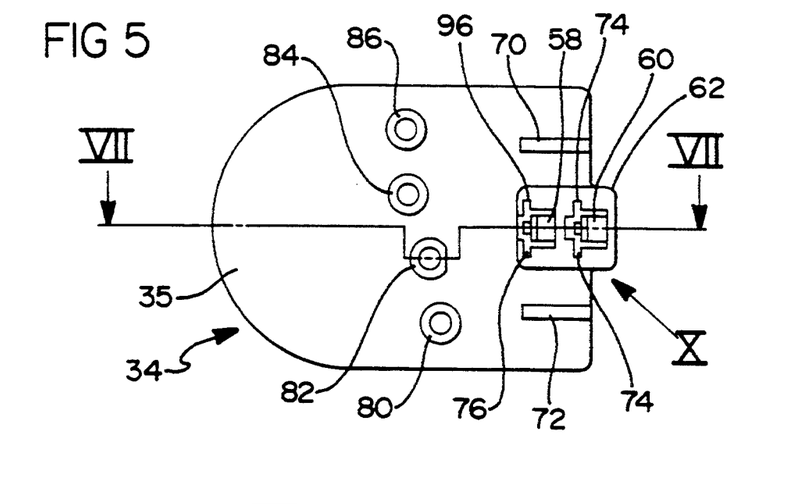
FIG. 5, is a bottom view of the connecting device according to FIG. 4 in the direction of arrow V.
Figure 6:
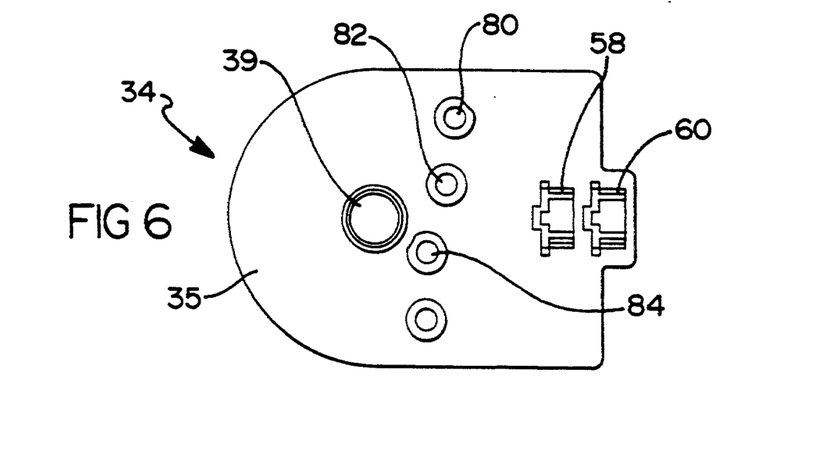
FIG. 6, is a top view on the connecting device according to FIG. 4 in the direction of arrow VI.
Figure 7:
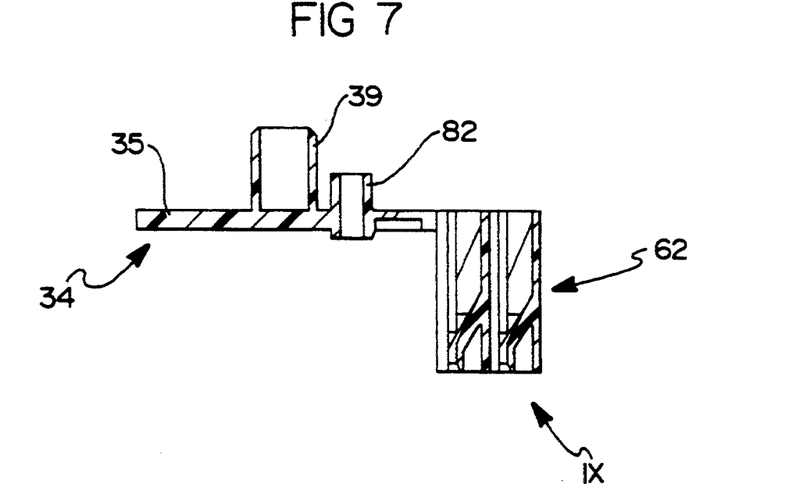
FIG. 7, is a section taken on the line VII—VII of FIG. 5.
Figure 8:
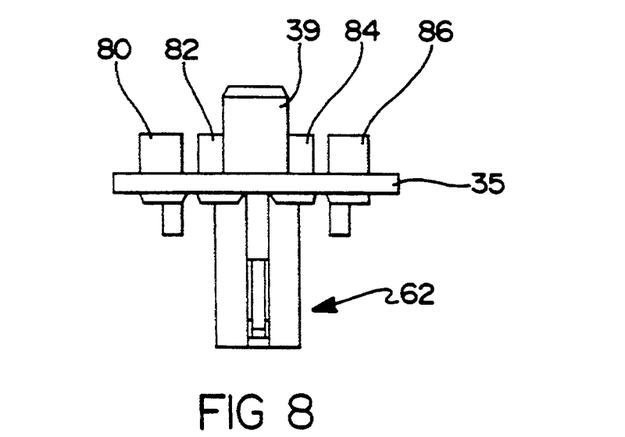
FIG. 8, is a view of the connecting device according to FIG. 4 in the direction of arrow VIII.
Figure 9:
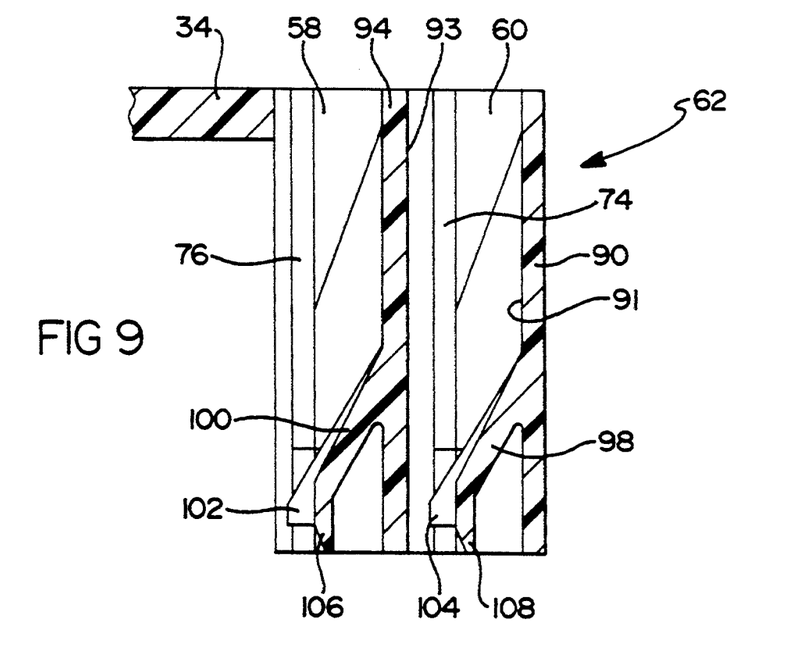
FIG. 9, is the part IX of FIG. 7 at an enlarged scale.
Figure 10:
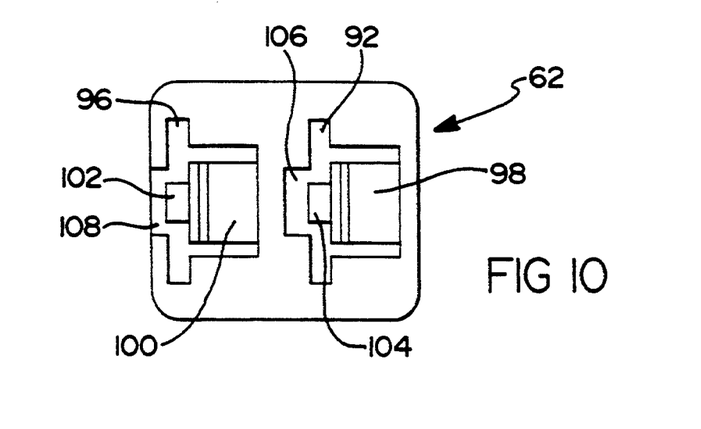
FIG. 10, is the part X of FIG. 5 at an enlarged sale.

FIGS. 1, 2 and 3 show two electric switches 10, 22 which are interconnectable by cables 18, 20. The electric switch 10, here a buzzer, has a plastic housing with two shanks of which each is provided with a bore 12, 16 for screws. Approximately in the center there is an actuating member 14. The switch 22 shown in FIGS 1 and 2 consists of a two-part housing, wherein of upper housing part 24 (top) is connected with the lower housing part 26 (base plate) by locking connections. The top 30 of upper part 24 receives a rotatable part 29 with a recess 28, which latter co-operates with a helical spring 32. The part 29 has a circular portion 40 the bottom of which carries a hollow-cylindrical piece 41. This hollow-cylindrical piece 41 is rotatably mounted on a pin 39 of an intermediary plate 34 of the switch housing. The intermediary plate 34 serves as a connecting device for producing a mechanical connection between the contact members being part of the switch 10 and the switch 22. The lower housing part 26 has several first contact members in the shape of switch blades 44, which are surrounded by an apron 40 and arranged in a half-open hollow space 46. The intermediary plate 34 is braced between a shoulder 31 of the upper housing part 24 and a circumferential web 33 of the lower housing part 26. Furthermore the lower housing part 26 has a half-open hollow space 54 for two contact members 50 and 52 surrounded by an apron 48. The upper and lower housing parts 24, 26 consist of a relatively hard, rigid plastic material, e.g. a thermoset, whereas the intermediary plate 34, which is connected with the two housing parts in a form-fitting and force-fitting way, consists of a softer plastic material with good springiness, e. g. a thermoplastic.

From FIG. 2 can be seen that the upper housing part 24 has a lug 66 with a bore 64 for a screw not shown in detail. The upper housing part 24 has an opening 71 towards contact member recesses 58 and 60 of the intermediary plate 34.

As can be seen especially from FIGS. 5 to 10 the intermediary plate 34 consists of a basic body 35 with contact member recesses 58 and 60 formed on it. The back of the basic body 35 comprises the pin 39 as well as further hollow-cylindrical pins 80, 82, 84, 86 and supporting webs 70 and 72. The contact member recesses 58 and 60 are accommodated in a common housing 62 and extend in the plug-indirection of the contact members. In the lower housing part 26 there is a channel 73 into which the housing 62 is inserted. The upper housing part 24 has a portion 65 with a cross-section which substantially corresponds to the contour of the lower housing part 26 and a following portion 67 with a round smaller cross-section than the portion 65. The two portions 65 and 67 are set off relative to each other in the area of the housing 62 of the intermediary plate 34 and pass into each other in a step 69. In the said step 69 the upper housing part 24 is provided with an opening 71 through which the contact member recesses 58 and 60 are accessible and through which the contact members 50 and 52 can be pushed into the recesses 58 and 60.

The contact member recesses 58 and 60 have each a locking means 98 and 100 in their lower region with a nose 102 and 104 formed thereon, whereby the noses 102,104 are operatively connectable with locking means 6 of the contact members 50 and 52. The contact member recesses 58, 60 have furthermore guide grooves 92, 74 and 96, 76 for the contact members 50 and 52. The locking means 98 and 100 are formed as resilient tongues falling off from one interior wall side 91 of a respective wall 90, 94 to an opposite wall side 93, 95. In relaxed condition the noses 102 and 104 project slightly into opposite recesses of the housing 62. The noses 102 and 104 are dimensioned in such a way that they cross the locking recesses and slightly protrude from them.

Finally FIGS. 11a and 11b show that the ends of the cables 18 and 20 carry a contact member 50 and 52 each. The contact members 50 and 52 are formed as contact blades and have each a locking recess 6 into which the noses 102 and 104 can engage. The free ends 1 of the contact members taper, whereas in the other end area stop projections 8 are provided. The contact members are inserted into the contact member recesses 58 and 60 from above and occupy the operating position shown in FIG. 3. The elastically deflectable locking means 98 and 100 are partially deflected when the contact members are inserted in the contact member recesses 58, 60 and exert a low pressure onto the contact members. If the contact members occupy the operating position shown in FIG. 3, the noses 102 and 104 cross the recesses 6. If this locking connection is to be released, it can be effected by pressing the free ends 106 and 108 of the locking means 98 and 100 in FIG. 9 slightly to the right, until the noses 102 and 104 leave the recesses 6. Thereafter the contact members can be drawn out.

It can be seen from the above statements that substantially a switch is concerned the electrically non-conductive parts of which consist of two different materials. The housing is of a hard material, namely a thermoset, whereas the connecting device consists of an elastically moldable plastic material, namely thermoplastic.

Figure 12:
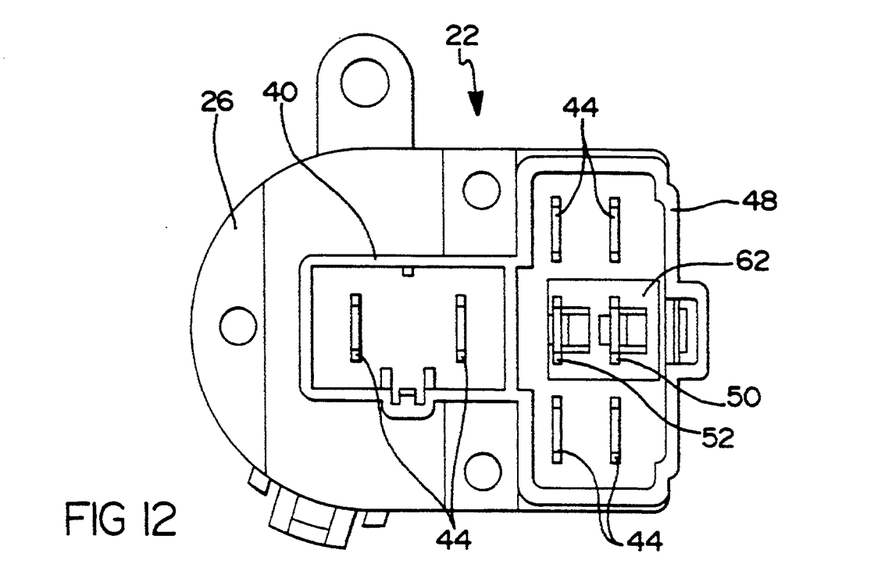
FIG. 12, is a view of one switch of FIG. 1 in the direction of arrow XII.

From FIG. 12 can be clearly seen that each one of the two contact members 50 and 52 is centrally arranged between the two first contact members 44 being part of the stationary contacts in the switch 22. The two contact members 50 and 52 and the two adjacent contact members 44 are jointly surrounded by the apron 48 which, just as the apron 40, is formed onto the base plate 26.

What is claimed is:

1. In combination:

a primary electrical device comprising first and second interlocking housing portions formed of relatively rigid material defining a cavity, an intermediate member formed of relatively resilient material retained in assembly with said first and second housing portions within said cavity, a plurality of contact blades held in a fixed array, at least one through-passage including an entrance and an exit formed in said first and second housing portions, respectively, and engagement means integrally formed in said intermediate member within said through passage; and a secondary electrical device disposed remote from said primary device and in-circuit therewith through at least one intermediate electrical conductor extending into said entrance and terminating at one end thereof in a contact member releasably engaged with said engagement means, said contact member extending from said exit in fixed orientation with said contact blades to establish a common electrical interface between an external host system and circuit components within said cavity and secondary electrical device.

2. The combination of claim 1, wherein said first and second housing portions are each integrally formed of molded thermosetting plastic and the intermediate member is integrally formed of molded thermoplastic.

3. A connecting device, in a combination comprising:
   a first switch including at least one first switch contact member;
   a second switch including at least one second switch contact member,
   a housing made of a hard synthetic material as compared with an elastically moldable resilient material, said housing including an upper housing part and a lower housing part, said lower housing part having a first cavity in which said at least one first switch contact member is disposed and a second cavity in which said at least one second switch contact member is disposed, said second cavity adjacent said first cavity; and
   the connecting device including locking means for locking said at least one first switch contact member into said first cavity and for connecting said first switch to said second switch, said locking means being made of electrically non-conductive parts, and
   a basic body in which said locking means are disposed, said body consisting of elastically moldable resilient material and said body including an intermediary plate between said upper housing and said lower housing.

4. A connecting device in a combination according to claim 3, wherein said elastically moldable resilient material is a thermoplastic material and said hard synthetic material is a thermosetting material.

5. A connecting device in a combination according to claim 3, wherein said basic body has at least one first switch contact member recess extending in a plug-in direction for receiving said at least one first switch contact member thereinto and said locking means has at least one nose disposed within said at least one first switch contact member recess, said at least one nose generally extending in the plug-in direction for operative connection with at least one locking recess of said at least one first switch contact member.

6. A connecting device in a combination according to claim 5, wherein said at least one first switch contact member recess has opposing first interior walls and opposing second interior walls, said second interior walls being orthogonal to said first interior walls and having guide grooves therein for guiding said at least one first switch contact member when said at least one first switch contact member is inserted into said at least one first switch contact member recess and wherein said locking means includes a resilient tongue, which depends obliquely from one first interior wall of said at least one first switch contact member recess toward the opposing interior wall, said tongue resiliently and yieldingly pressing against said at least one first switch contact member, said at least one first switch contact member being disposed between said tongue and said opposing interior wall.

7. A connecting device in a combination according to claim 6, wherein said at least one nose disposed on said tongue.

8. A connecting device in a combination according to claim 7, wherein said at least one first switch contact member has a locking recess and said nose is received by said locking recess as said tongue resiliently and yieldingly presses against said at least one first switch contact member.

9. For connecting a first switch to a second switch, a combination of the second switch and a connecting device, the combination comprising:
   said second switch having a housing made of a hard synthetic material as compared with an elastically moldable resilient material, said housing including at least two housing parts, one of said housing parts having a first half-open hollow space for disposition of at least one contact member of said first switch when said first switch is connected to said second switch and a second half-open hollow space in which a contact member of said second switch is disposed, said second half-open hollow space adjacent said first half-open hollow space; and
   said connecting device having a plate structure disposed between said housing parts, said connecting device for connecting said first switch to said second switch, and said connecting device consisting of elastically moldable resilient material and said connection device including locking means for locking said at least one first switch contact member to said connecting device.

10. A combination according to claim 9, wherein one of said housing parts has at least one housing part channel extending in a plug-in direction and said connecting device has at least one first switch contact member recess extending in said plug-in direction and into said at least one housing part channel, for inserting said at least one first switch contact member into said at least one first switch contact member recess.

11. A combination according to claim 10, wherein said connecting device is firmly connected to said one of said housing parts at said at least one housing part channel to limit deformation of said connecting device and transfer forces created by high pressure to said housing without deforming said housing whereby, when said at least one first switch contact member is inserted into said at least one first switch contact member recess and thereby causes high pressure in said connecting device causing said connecting device to deform, the deformation of the connecting device will be limited and said housing parts will not be deformed.

12. An electric switch for motor vehicles, comprising: a switch housing including a base plate portion having a recess, and a top portion;
   at least one first contact member projecting externally through the base plate;
   a second contact member adapted to be received within said recess,
   an electric lead attached to said second contact member: and
   a second electric switch attached to said electric lead.

13. An electric switch according to claim 12, wherein at least one recess is formed in a housing on an intermediary plate of the switch housing.

14. An electric switch according to claim 13, wherein the housing with the recess is inserted in a channel of the base plate of the switch housing.

15. An electric switch according to claim 13, wherein the top of the switch housing has a step in which an opening is positioned through which the at least one recess on the intermediary plate is accessible for inserting at least a second contact member.

16. An electric switch according to claim 13, wherein the intermediary plate consists of a plastic material which is less resistant to bending than the plastic material of which the base plate consists.

17. An electric switch according to claim 13, wherein the at least one second contact member is surrounded by an apron formed onto the base plate.

18. An electric switch according to claim 12, wherein a second contact member is arranged between two first contact members.

19. An electric switch according to claim 18, wherein the first and second contact members are surrounded by a common apron formed onto the base plate.

* * * * *